United States Patent [19]

Tindell et al.

[11] Patent Number: 5,130,792
[45] Date of Patent: Jul. 14, 1992

[54] STORE AND FORWARD VIDEO SYSTEM

[75] Inventors: Elbert G. Tindell, Dallas; Kyle Crawford, Grand Prarie, both of Tex.

[73] Assignee: USA Video Inc., Dallas, Tex.

[21] Appl. No.: 475,137

[22] Filed: Feb. 1, 1990

[51] Int. Cl.⁵ .............................................. H04N 7/14
[52] U.S. Cl. ........................................ 358/85; 358/86; 358/102; 358/134; 379/100
[58] Field of Search ..................... 358/86, 133, 85, 134, 358/102; 379/53, 100

[56] References Cited

U.S. PATENT DOCUMENTS

| 4,028,733 | 6/1977 | Ulicki | 358/102 X |
| 4,506,387 | 3/1985 | Walter | 455/612 |
| 4,513,390 | 4/1985 | Walter et al. | 358/102 X |
| 4,703,348 | 10/1987 | Yuasa | 358/133 |
| 4,769,833 | 9/1988 | Farleigh et al. | 358/86 X |
| 4,772,956 | 9/1988 | Roche et al. | 358/134 X |
| 4,782,397 | 11/1988 | Kimoto | 358/102 X |
| 4,816,901 | 3/1989 | Music et al. | 358/85 X |
| 4,890,320 | 12/1989 | Monslow | 380/10 |
| 4,890,321 | 12/1989 | Seth-Smith et al. | 358/86 X |
| 4,918,523 | 4/1990 | Simon | 358/133 |
| 4,924,311 | 5/1990 | Ohki et al. | 358/133 X |
| 4,947,244 | 8/1990 | Fenwick | 358/86 |
| 4,949,187 | 8/1990 | Cohen | 358/102 X |
| 4,953,196 | 8/1990 | Ishiwaka et al. | 358/85 X |

Primary Examiner—Victor R. Kostak
Attorney, Agent, or Firm—Kenneth C. Hill

[57] ABSTRACT

A system and method for transferring video programs from a first location to a remote location provides for communication of the programs over selected commercial telephone networks. The program signals are digitized, compressed, and stored at the first location, and transferred to the remote location on request of a viewer. Due to the compression of the program, the time required for electronically transferring the program to the remote location is much less than the viewing time for such program. The compressed program is reconstructed at the remote location for viewing on available video display devices.

9 Claims, 4 Drawing Sheets

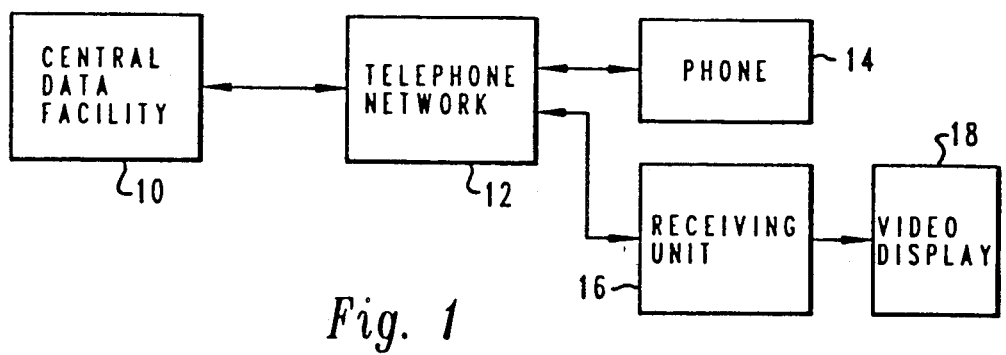
Fig. 1
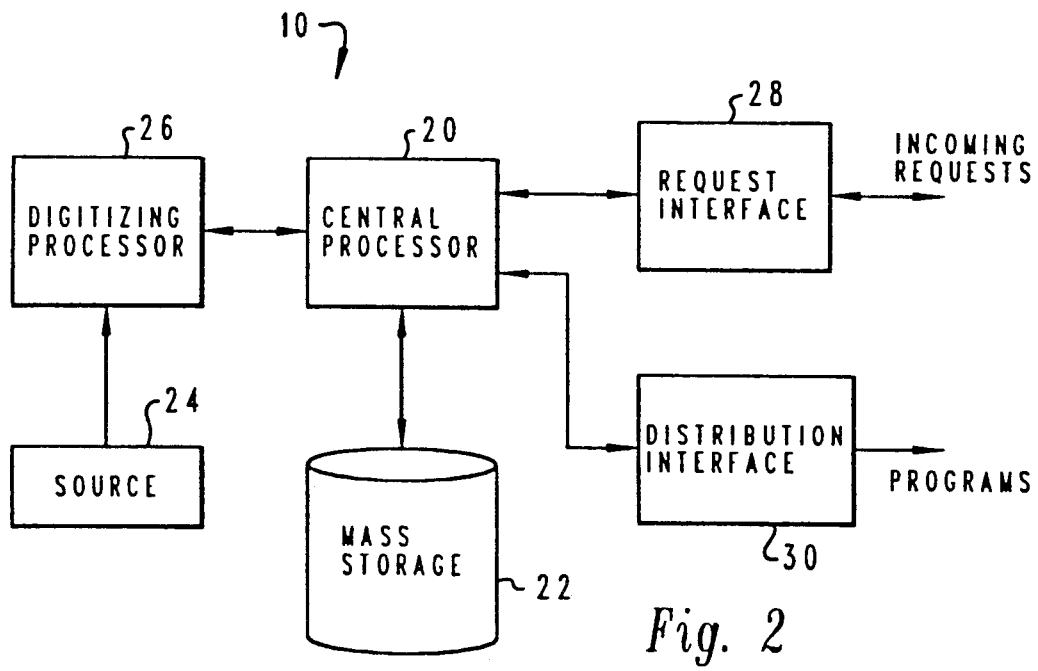
Fig. 2
Fig. 3
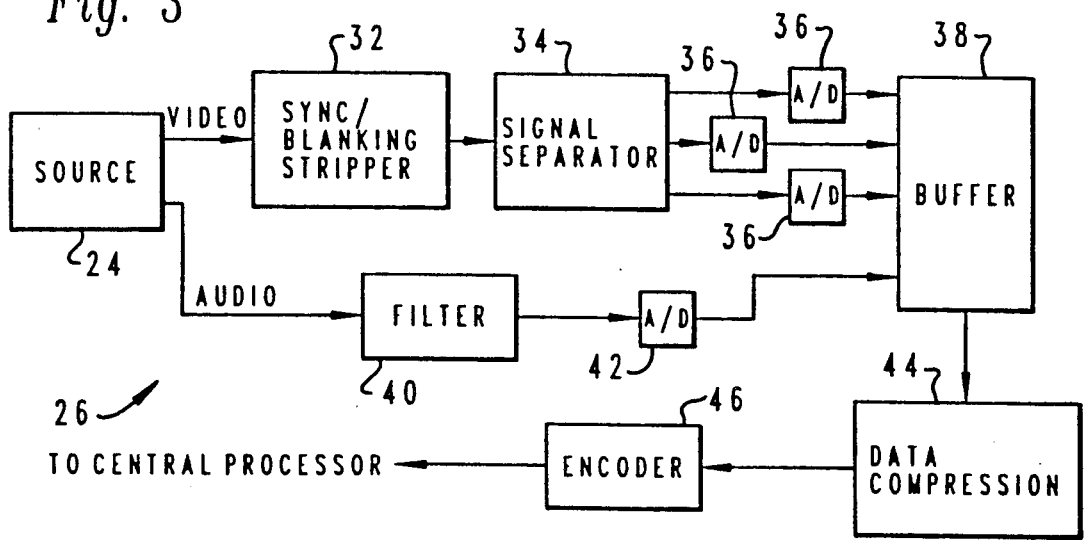

STORE AND FORWARD VIDEO SYSTEM

BACKGROUND OF THE INVENTION

1. Field of the Invention

The present invention relates generally to video systems and more specifically to a system and method for transferring a video program for display at a remote location.

2. Description of the Prior Art

Viewing of various types of video programs has become increasingly popular. These programs are generally viewed on standard television sets. Typical video programs include motion pictures, entertainment produced for television, and educational and training programs. An extremely wide variety of programs have been designed or adapted for television viewing.

In order to transfer the video programs to a remote location where they can be viewed, programs can be broadcast using radio waves, transferred to the remote location by means of a specially installed dedicated cable, or transfer of a physical copy on video tape or video disk can be made. Each method of distributing video programs has drawbacks for certain applications.

When video programs are transferred using radio waves, there is little or no control over who receives and views the program. This method of transferring video programs is not suitable for limited distribution of pay programs. In addition, the number of channels for transferring programs is not unlimited, and picture quality of the program can be degraded by atmospheric conditions.

Barring technical problems, programs transferred to a remote location along a specially installed, dedicated cable generally have a reliably good picture quality. However, the cable must be installed at each remote location, and controlled through a centralized facility. Although many video channels can be carried over some cable systems, the number of channels is, again, not unlimited. As is the case with broadcast systems, transmitting equipment must be made available at the time any particular program is to be viewed. The selection of programs and times for viewing are made centrally, as is the case with broadcast systems, and are not under the control of a viewer at a remote location.

Physical transport of video tapes to a remote location allows the viewer to select the program to be viewed and the time for viewing. However, such tapes must be physically transported to the remote location. This takes time, and is often not convenient for the viewer. In addition, the physical video tape or disk containing the programming is subject to loss, theft, and deterioration.

It would be desirable to provide a system and method for transmitting video programs to remote locations which overcomes various drawbacks as described above.

SUMMARY OF THE INVENTION

It is therefore an object of the present invention to provide a system and method for transferring video programs from a first location to a remote location.

It is another object of the present invention to provide such a system and method wherein the programs are electronically transferred in a short period of time relative to the viewing time of the programs.

It is a further object of the present invention to provide such system and method which does not require that special, dedicated cables be connected to the remote location.

Therefore, according to the present invention, a system and method for transferring video programs from a first location to a remote location provides for communication of the programs over selected commercial telephone networks. The program signals are digitized, compressed, and stored at the first location, and transferred to the remote location on request of a viewer. Due to the compression of the program, the time required for electronically transferring the program to the remote location is much less than the viewing time for such program. The compressed program is reconstructed at the remote location for viewing on available video display devices.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

FIG. 1 is a high level block diagram of a system for transferring video programs to a remote location;

FIG. 2 is a block diagram of a central data facility;

FIG. 3 is a block diagram of a system for digitizing and compressing video programs;

DESCRIPTION OF THE PREFERRED EMBODIMENT

Figure 4:
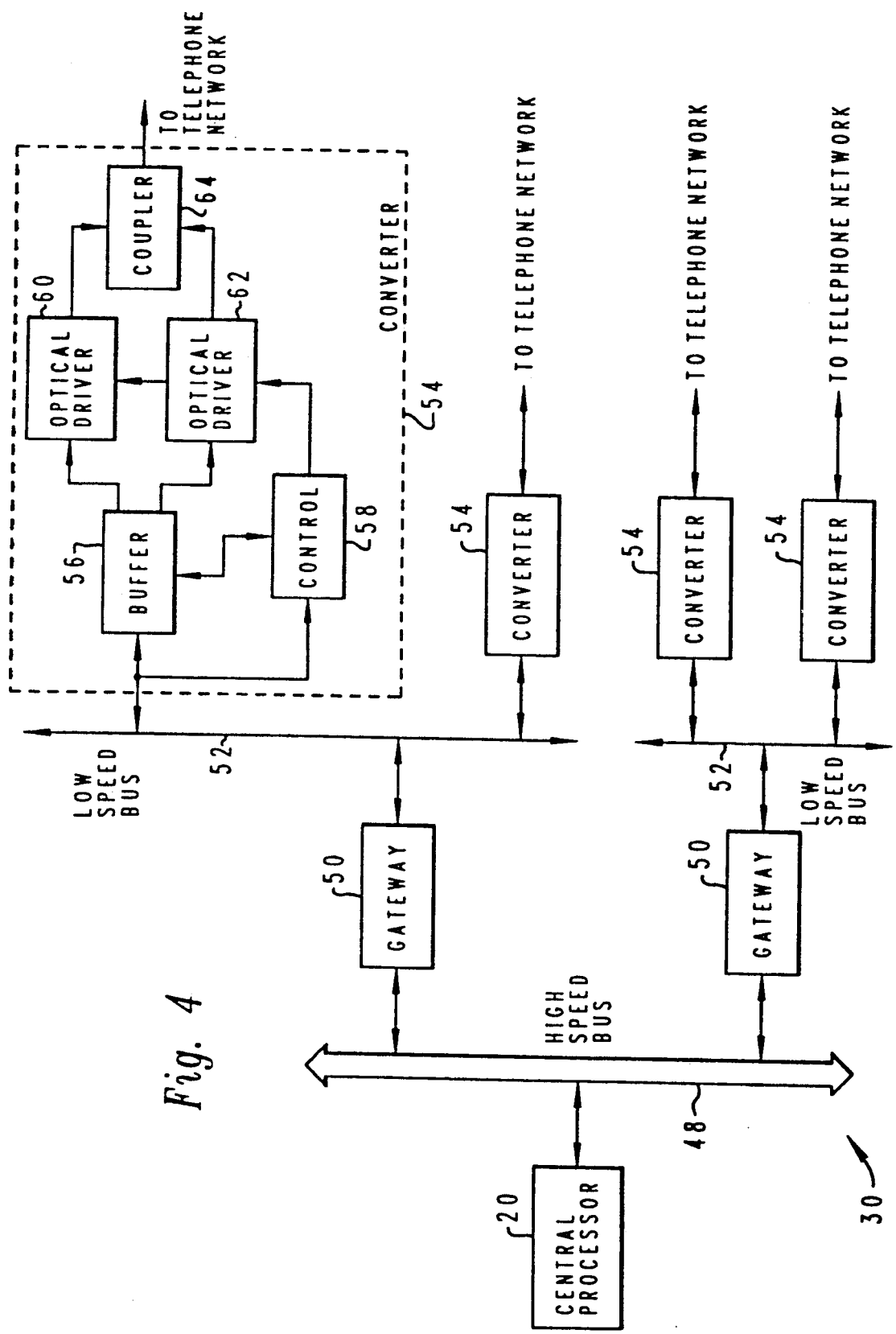
FIG. 4 is a block diagram of a distribution interface for use with the system of FIG. 1.

Referring to FIG. 1, a system for transferring video programs to a remote location includes a central data facility 10 connected to a commercial telephone network 12. The central data facility 10 will be described in further detail in connection with the following figures. Telephone network 12 preferably includes optical fiber connections capable of transferring digital data at very high rates. Such optical fiber systems are currently being installed in selected locations in the United States, and are expected to be widely available in the future.

At a remote location, a telephone 14 and receiving unit 16 are connected to the telephone network 12. A video display device 18, such as a television conforming to the NTSC standard, is connected to the receiving unit 16 for displaying video programs which have been transferred from the central data facility 10 to the receiving unit 16. A viewer who wishes to down load a program from the central data facility 10 into his receiving unit 16 calls the central data facility 10 using the normal telephone 14. After the program has been ordered, the user places the telephone 14 on-hook and switches the receiving unit 16 to standby. The central data facility 10 then returns the call and down loads the requested program into the receiving unit 16 for viewing at a time selected by the viewer.

A keyboard or other input device is preferably provided on the receiving unit 16 for the viewer to identify the requested program. Identifying information for the receiving unit, used for billing and call-back, can be stored in the receiving unit.

A block diagram of the central data facility 10 is shown in FIG. 2. The central data facility 10 includes a central processor 20 connected to one or more mass storage devices 22. Mass storage devices 22 are preferably high density devices such as optical disks. Programs which are to be handled by the central data facility 10 are originally provided from one or several different types of video source 22 as known in the art. The video programs are digitized and compressed in a digitizing processor 26, and transferred to the central processor 20 for retention in mass storage devices 22.

Incoming requests for programs are connected to a request interface 28, which is in turn connected to the central processor 20. Outgoing programs being transmitted to remote receiving units are routed through a distribution interface 30.

In a preferred embodiment, a user connects to the central data facility 10 through the request interface 28 by means of a standard TOUCH-TONE (DTMF) telephone. Once a connection has been made, the viewer can identify himself and request any available program by entering a proper set of codes. The DTMF tones transferred to the request interface 28 are converted to characters and transmitted to the central processor 20. Central processor 20 identifies the caller and determines whether the requested selection is available. Desired information, such as the availability of a selection, any delay which may be incurred prior to down loading the selected program, or an indication of the charges incurred in the transaction, can be returned to the viewer through a request interface 28 by means of DTMF tones or recorded or synthesized spoken messages.

Once a request has been made and acknowledged, central processor 20 selects an available output channel to distribution interface 30, and requests a telephone switching network connection. Since each viewer must identify himself when the request is made, central processor 20 is able to call an authorized number at a known location corresponding to such user. Once the connection is established, the requested program can be transferred from mass storage 22 through the distribution interface 30 to the remote location. Accounting data regarding the transaction is logged by the central processor 20 for administrative purposes.

Referring to FIG. 3, a block diagram of the digitizing and compression processor 26 is shown. Source 24 provides separate video and audio signals to processor 26. The video signal is applied to a sync and blanking stripper circuit 32. The various sync signals and blanking intervals contained in the video signal are necessary only for display of the program, and can be recreated in the receiving unit 16. The output from sync and blanking stripper 32 is connected to a signal separator 34, which breaks the video signal into its various basic elements. The number of separate channels into which the video signal is separated at this point will depend upon system implementation, with signals such as luminance and chromanence being likely candidates for separate handling.

The separated signals are then converted to digital signals in analog to digital converters 36, and stored in a buffer 38. As shown in FIG. 3, three separate video signals are digitized, but one, two, or more than three signals may be used. If the video signal is not split into two or more parts, the output of the sync and blanking stripper 32 can be input directly to an analog to digital converter 36.

Since the audio signal is frequency modulated instead of amplitude modulated, it is preferably handled separately from the video signal. The audio signal is demodulated and filtered in filter 40, and digitized in analog to digital converter 42. The audio signal is also stored in buffer 38.

Digital data from buffer 38 is input to a data compression circuit 44. Compressed data is input to an encoder 46, which encrypts the data in order to preserve privacy. From the encoder 46, the digital data representing the program originally provided by the source 24 is transferred to the central processor 20.

Buffer 38 can be a relatively small buffer, which requires that data be extracted therefrom and compressed in data compression circuit 44 as it is being generated by the source 24. In the alternative, buffer 38 can include mass storage capable of holding an entire program. In this event, the compression and encoding of the data can be performed after the entire program has been digitized, if desired.

Referring to FIG. 4, a block diagram of a preferred embodiment for the distribution interface 30 is shown. Central processor 20 is connected to a high speed bus 48, which is in turn connected to several gateways 50. Although two gateways 50 are shown in FIG. 4, the number actually used depends upon details of the system implementation, especially with reference to the data throughput capabilities of the central processor 20 and the gateways 50.

Each gateway 50 is connected to a low speed bus 52. Each low speed bus 52 is preferably a commercially available local area network. A plurality of optical converters 54 are connected to each low speed bus 52. In FIG. 4, only two converters 54 are shown connected to each low speed bus 52, but more are preferably connected in an actual implementation. The number of converters 54 connected each low speed bus 52 depends on the data transfer rate of the converters 54 and data handling capability of the buses 52.

Data transferred to a converter 54 is placed into an internal buffer 56. Control circuitry 58 controls operation of the converter 54 and communicates with the gateway 50 over low speed bus 52. Control circuitry 58 also controls operation of optical drivers 60, 62. Each optical driver 60, 62 transmits the data from buffer 56 via a modulated light signal as known in the art. Each optical driver 60, 62 is connected to an optical coupler 64, which combines the different light signals onto a single optical fiber. In a preferred embodiment, optical drivers 60, 62 generate light having different wavelengths, which is multiplexed onto a single optical fiber by coupler 64. Particular system designs can utilize only a single optical driver 60, or more than the two optical drivers 60, 62 shown in FIG. 4.

The distribution interface 30 shown in FIG. 4 allows a single central processor 20 to drive a relatively large number of converters 54 at one time. Various alternative designs to that shown in FIG. 4 can, of course, be utilized if desired.

Figure 5:
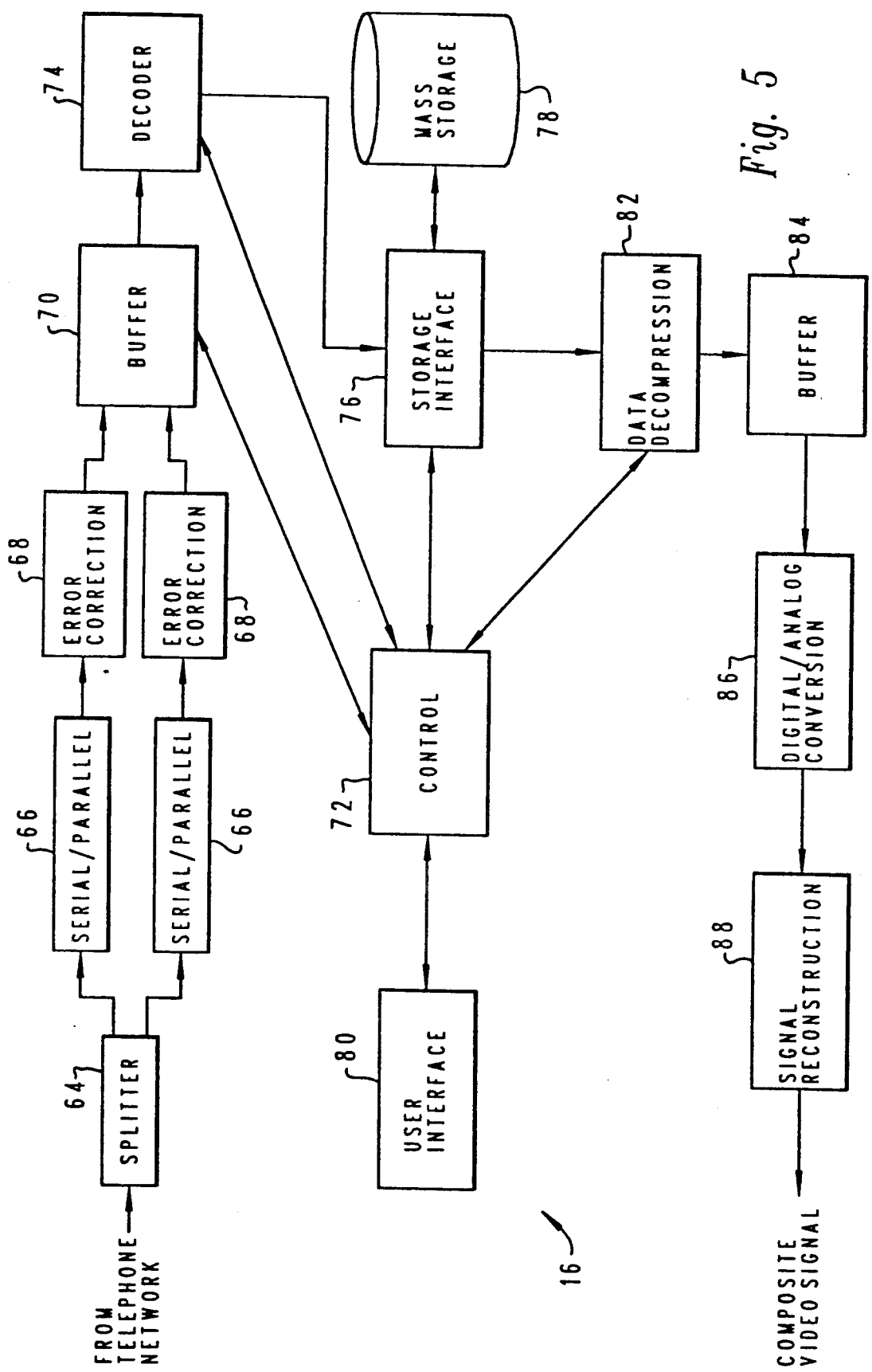
FIG. 5 is a block diagram of a receiver for use at a remote location.

FIG. 5 shows a preferred embodiment of receiving unit 16. The receiving unit 16 shown in FIG. 5 is used only as a stand alone receiver, and does not incorporate the automatic program request facilities described in connection with FIG. 1.

The incoming optical signals are filtered by wavelength and split in optical splitter 64, and converted to digital electrical signals. In the embodiment shown in FIG. 5, two different wavelengths of light were used to transmit information over the optical fiber connection, so two separate channels of digital information are generated by splitter 64. The number of optical drivers 60, 62 as described in connection with FIG. 4 determines the number of channels into which the incoming data is split by splitter 64.

Each channel of digital data is connected from splitter 64 to a serial to parallel converter 66, which converts the serial data to byte-wide data. As is known in the art, the serial transmission of the program data preferably includes redundant error correcting code (ECC), allowing for correction of errors within the receiving unit 16. Error correction is performed in error correction units 68, and the data is temporarily stored in buffer 70.

Under control of control unit 72, data is removed from buffer 70 and transferred to decoder 74. Decoder 74 decrypts the compressed data, undoing the encryption effects of encoder 46 described in connection with FIG. 3. Decoded data is then transferred through storage interface 76 and stored into mass storage device 78. Mass storage device 78 is preferably an erasable optical disk, or other similar relatively low cost, high density storage medium.

Data is stored onto mass storage device 78 until the entire requested program has been down loaded from the central data facility 10. Due to the removal of unnecessary information, compression of the remaining data, and high speed transfer, this down loading can be accomplished in much less time than is required to view the program in real time. Once transfer has been completed, control unit 72 communicates such fact to user interface 80, which indicates through visual or audible means to a viewer that the down loaded program is now available for viewing. User interface 80 provides basic functions for the viewer, such as setup for down loading a program, play a program, and pause during play of a down loaded program.

Once a viewer selects the play mode, control unit 72 causes the data stored in mass storage device 78 to be transferred through storage interface 76 to a data decompression unit 82. Data decompression unit 82 restores the compressed data to its raw, uncompressed form, and transfers it to buffer 84. Data is extracted from buffer 84 in real time as needed for viewing, and converted to analog form in digital to analog converter 86. The original video and audio signals are then restored in signal reconstruction circuit 88, which restores blanking intervals, sync signals, and the like which were removed in the digitizing and compression processor 26. The output of signal reconstruction circuitry 88 is a composite video signal or a modulated RF signal suitable for input to a standard television set. If desired, the program signal can alternatively be recreated as a digital signal suitable for display on a digital monitor as known in the art.

Figure 6:
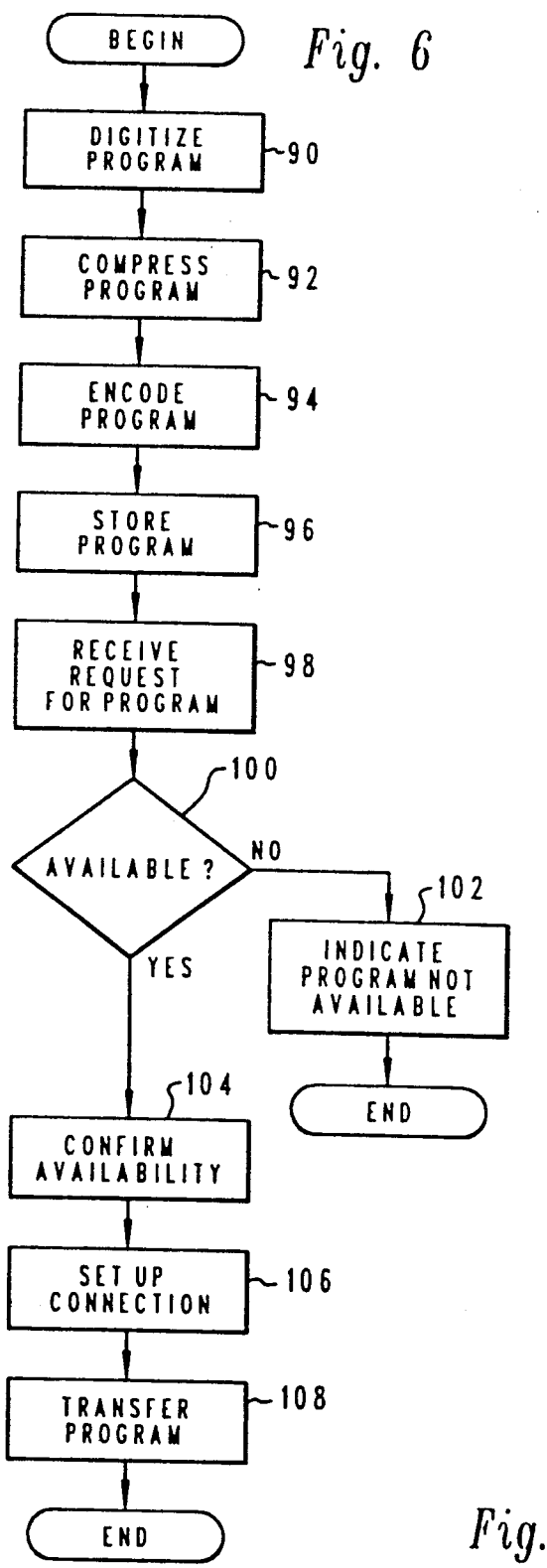
FIG. 6 is a flowchart describing a method for making video programs available for transfer to a remote location.

Referring to FIG. 6, a preferred method for making a video program available for transmission to a remote location is shown. The program is first digitized 90 and compressed 92 as described in connection with FIG. 3. The program is also preferably encoded 94, and stored 96 in a non-volatile mass storage device. If desired, the encoding step 94 may be left out.

At this point, the program is compressed and stored in condition to be transferred. The number of programs which can be stored at one time is limited only by the capabilities of the central processor 20, and the storage available in mass storage devices 22. When a request is received for a particular program 98, a check is made to see whether that program is available 100. If the requested program is not available, perhaps because the viewer made a mistake when entering his selection, such fact is indicated to the viewer 102. If the program is available for down loading, that fact is confirmed to the viewer 104 and the central data facility 10 sets up a telephone connection with the remote location 106. Transfer of the program 108 is then performed as described above.

Figure 7:
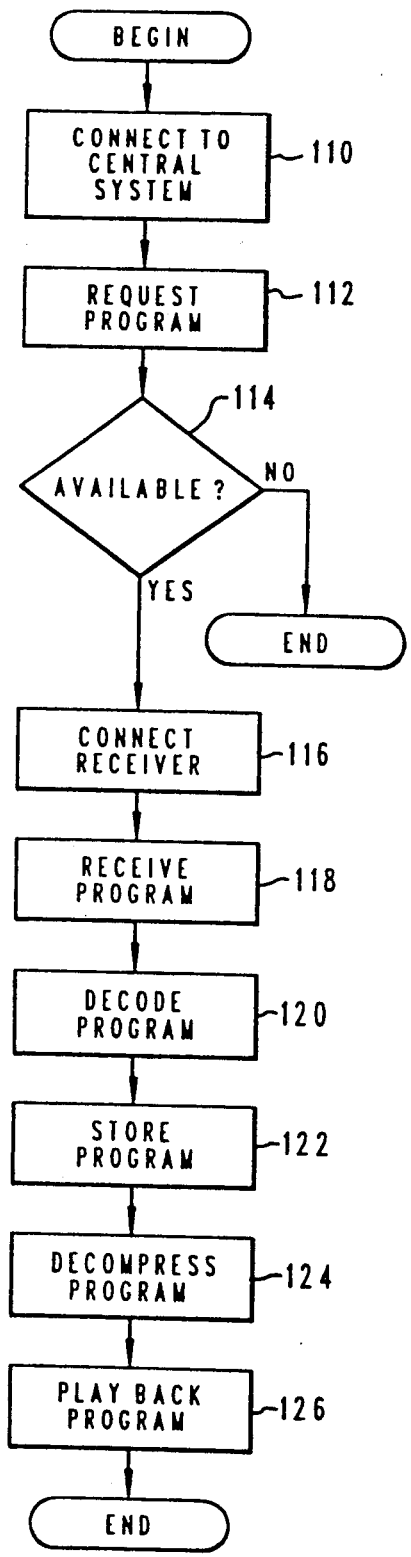
FIG. 7 is a flowchart illustrating a method for requesting, receiving, and displaying video programs at a remote location.

Referring to FIG. 7, a preferred method is shown by which the receiving unit 16 at the remote location receives and displays a requested program. First, a connection is made to the central data facility 110. As described above in connection with FIG. 1 this is preferably done by utilizing a standard TOUCH-TONE (DTMF) telephone handset to dial the central facility and enter a selection.

The viewer then requests the desired program 112, and waits to see if it is available 114. If not, the process is complete. If the requested selection is available, the viewer hangs up the telephone handset and switches the receiving unit 16 to standby. The program is then received by the receiving unit 118, decoded, and stored into mass storage 122. When the viewer is ready to view the program, it is decompressed 124 and played back 126 for viewing on a video display. The viewer may preferably pause display of the program at any time by entering a command at the user interface 80, and may view the program multiple times.

The convenience and usefulness of the system described above depends in large part on the ability to be able to quickly down load a video program to the receiving unit 16. In order to illustrate the convenience of the system described above, an example illustrating the numbers involved will now be described.

A single television channel has a 6 megahertz bandwidth. By stripping unnecessary signals as described above, a video signal can be sampled at a rate of 16 megahertz and retain a good signal quality. Samples having a resolution of 8 bits provide sufficient video fidelity for television purposes. This results in a raw data rate of 16 megabytes per second of video data.

Assuming a desired program, such as a motion picture, to have a length of two hours, 7200 seconds of data must be digitized and stored. At a rate of 16 megabytes per second, this results in 115.2 gigabytes of raw data. As is known in the art, video information is highly redundant, so that large compression factors are obtainable. This means that a total data storage requirement of approximately 2–4 gigabytes is expected to be sufficient for a two hour video program. This is the storage requirement for a single program both in the central data facility 10 and the receiving unit 16. This amount of data is well within the capability of optical disks which are presently becoming available.

Assuming 2.3 gigabytes are required for a compressed program, and that a 50% overhead is required for serial transmission of the program data, for error correcting code, blocking, and the like, 3.45 gigabytes of serial data must be transmitted between the central data facility 10 and the receiving unit 16. At eight bits per byte, this results in 27.6 gigabits to be transferred.

Optical fiber connections currently planned for installation to residential customers will have a maximum data transfer rate of 144 megabits per second. At this rate, the required 27.6 gigabits can be transferred to the receiving unit 16 in 192 seconds, which is just over three minutes. Thus, approximately three minutes is required to transfer a typical video program to the receiving unit 16.

Note that the numbers described above do not require the use of more than one wavelength of light on a single optical fiber. If it is necessary to increase the sampling rate, or the magnitude of each sample, two or more wavelengths of light can be multiplexed on a single cable as described in connection with FIGS. 4 and 5. This would allow better resolution of the video signal with no increase in transmission time.

If a video camera and compression circuitry is available at a remote location, it is possible to use the system described above to transfer video information between two remote locations. A call to the central data facility can be used to initialize the connection between two remote locations, and the central data facility is no longer involved once the connection is setup. Near real-time video signals obtained at one location are compressed and transferred to the second remote location over the phone lines. Instead of storing the signals onto the mass storage device 78, they are transferred directly to the data decompression circuitry 82 and displayed at the second remote location. Near real-time video communication can be accomplished by providing cameras and compression circuitry at each end of a conversation.

While the invention has been particularly shown and described with reference to a preferred embodiment, it will be understood by those skilled in the art that various changes in form and detail may be made therein without departing from the spirit and scope of the invention.

What is claimed is:

1. A system for transmitting video programs to remote locations over a switched telephone network, comprising:
   a central data facility having means for storing digital compressed versions of video programs;
   a request interface connected to said central data facility and to the telephone network, wherein said request interface receives requests for video programs made over the telephone network and communicates them to said central data facility;
   a distribution interface connected to said central data facility and to the telephone network, wherein said distribution interface initiates connections over the telephone network with remote locations in response to requests received by said request interface, and transmits thereto compressed versions of video programs previously requested through said request interface, such compressed versions being transmitted in less time than is required to view the programs in real time;
   a receiver at each remote location for connecting to the telephone network and receiving compressed video programs transmitted from said distribution interface, for storing the received programs, and for subsequently playing the video programs at a real time rate on a video display.

2. The system of claim 1, wherein requests are made to said request interface through preselected sequences of DTMF transmissions made from a telephone transceiver.

3. The system of claim 1, wherein said distribution interface comprises:
   a plurality of converters for converting digital video programs to a format suitable for transmission over a telephone line; and
   a controller for simultaneously providing data representative of digital compressed video programs to each of said converters, wherein a plurality of the remote receivers can be simultaneously receiving such programs.

4. The system of claim 3, wherein said controller comprises:
   a high speed central processor for providing processing and data transfer functions;
   at least one gateway connected to said central processor by a high speed communications bus; and
   a communications network having a lower data carrying capacity than the high speed communications bus connected to each of said gateways, wherein a plurality of converters are connected to each communications network, and wherein said central processor controls the transfer of data to said converters through said gateways over the high speed communications bus and said communications network.

5. The system of claim 1, further comprising:
   means for inputting video programs; and
   conversion means connected to said inputting means and to said central data facility for digitizing and compressing video programs read in to said inputting means, and for transmitting such compressed video programs to said central facility for storage and subsequent transmission to remote locations.

6. A method for viewing video programs at a location remote from a central data facility, comprising the steps of:
   receiving at the central data facility a request for a selected program over a switched telephone network, such request identifying a preregistered requester;
   determining whether the selected program is available;
   if the selected program is available, initiating a connection over the telephone network to a remote receiving unit previously associated with the preregistered requester;
   transmitting a previously stored compressed version of the selected program over the initiated connection in less time than is required to view the program in real time;
   receiving the selected program at the remote receiving unit and storing it on a mass storage device; and
   after all of the selected program has been stored on the mass storage device, decompressing the selected program and playing it back in real time on a video display.

7. The method of claim 6, wherein the request received at the central data facility comprises a sequence of tones generated by a DTMF telephone.

8. The method of claim 6 wherein, if the selected program is available, such availability is confirmed during a connection in which such request is made, followed by terminating such connection prior to said step of initiating a connection.

9. A system for transmission of video programs over a switched telephone network, comprising:

a central data facility for storing a plurality of video programs in a digital, compressed format;

means connected to said central data facility for digitizing and compressing video programs, and communicating them to said central data facility for storage;

a request interface connected to the telephone network and to said central data facility for receiving requests for desired video programs over the telephone network, such request being communicated to said request interface by sequences of tones generated by a DTMF telephone in response to a user pressing buttons thereon in selected patterns, such patterns identifying the user and the desired video program, wherein said request communicates to the user a confirmation of availability if a desired video program is available for the communication to the user;

a distribution interface connected to said central data facility and to the telephone network, said distribution interface containing a plurality of converters for converting compressed digital data to a form suitable for transmission over the telephone network, wherein said distribution interface initiates a connection with a receiving unit at a preselected remote location in response to the user's request and transmits the digitized, compressed video program to such remote unit over such connection in less time than is required to view the program in real time;

a plurality of receiving units at a plurality of remote locations, each of said receiving units connected to the telephone network and being capable of completing a connection initiated by said distribution interface and receiving digitized, compressed video programs over such connections, wherein each of said receiving units includes a mass storage subsystem for storing a received video program in compressed format, and a decompression subsystem for reading a stored video program from the mass storage subsystem at the user's convenience and converting it to a decompressed form suitable for display in real time; and a video display device connected to each receiving unit for displaying the converted video program.

* * * * *